United States Patent Office 2,795,580
Patented June 11, 1957

2,795,580

SYNTHESIS OF NUCLEOSIDE POLYPHOSPHATES

Har Gobind Khorana, Vancouver, British Columbia, Canada, assignor to Canadian Patents and Development Limited, Ottawa, Canada, a company No Drawing. Application May 27, 1955,
Serial No. 511,802

13 Claims. (Cl. 260—211.5)

This invention relates to the synthesis of nucleoside polyphosphates. This application is a continuation-in-part of application Serial No. 437,006, now abandoned.

In order to clarify the exact nature of the chemical compounds involved with the present invention a few definitions will first be given before proceeding with the description of the invention.

A nucleoside is an N-glycoside of a heterocyclic base, generally a pyrimidine or a purine. Examples of neucleosides are:

1. Uridine (or uracil riboside):

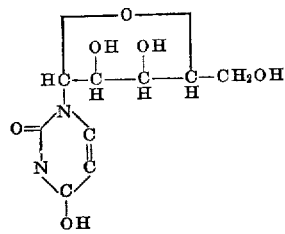

2. Adenosine (or adenine riboside):

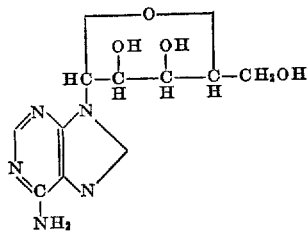

3. Guanosine (or guanine riboside):

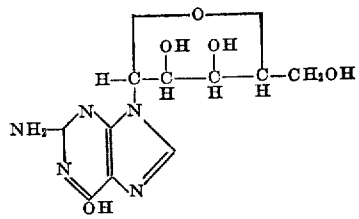

4. Cytidine:

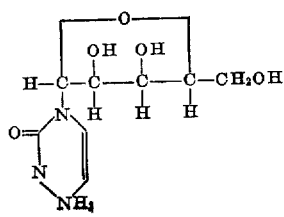

5. Inosine:

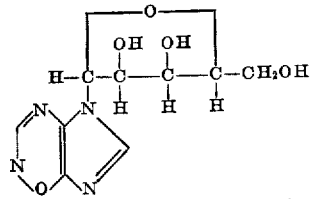

The term "nucleoside" is used herein to include "desoxynucleosides." Thus, "nucleosides" within the meaning of the present invention are:

6. Thymidine (or desoxythymine riboside):

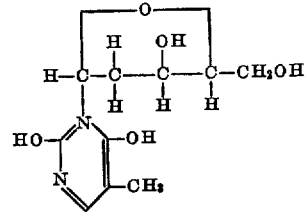

7. Desoxyadenosine.
8. Desoxycytidine.
9. Desoxyguanosine.

Nucleosides will be considered as ROH for abbreviation in the formulae which follow hereinafter.

A mononucleotide is a phosphoric ester of a nucleoside and may be a nucleoside monophosphate or a nucleoside polyphosphate. Examples of nucleoside monophosphates are:

1. Adenosine 5'-phosphoric acid (or muscle adenylic acid or adenosine monophosphate, the latter hereinafter termed AMP):

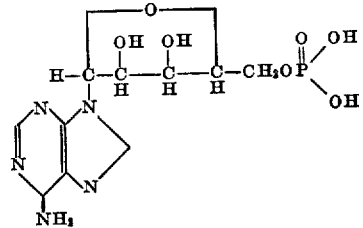

or

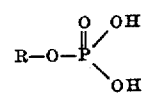

2. Adenosine 3'-phosphoric acid (or yeast adenylic acid):

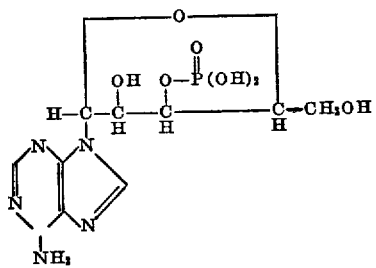

3. Uridine 5'-phosphate (hereinafter termed UMP)

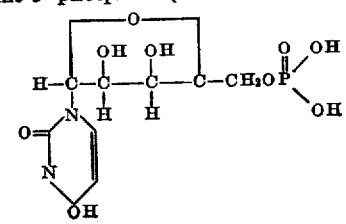

4. Guanosine 5'-phosphate:

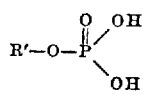

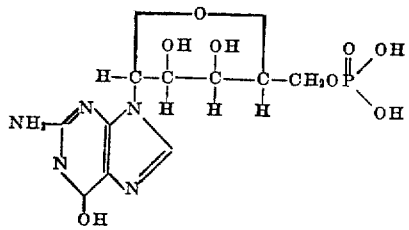

or

5. Cytidine 5'-phosphate:

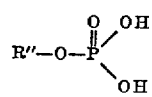

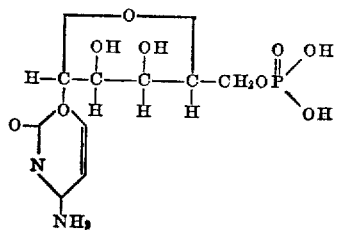

or

6. Inosine 5'-phosphate:

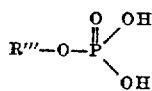

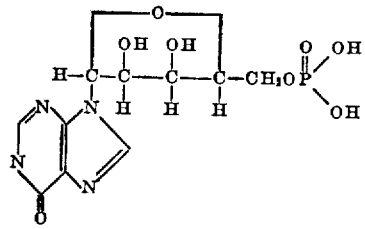

or

7. Thymidine 5'-phosphate:

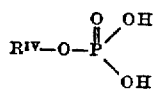

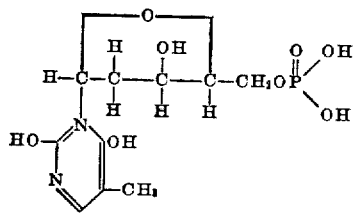

or

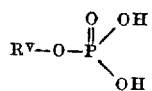

Examples of nucleoside polyphosphates are:
1. Adenosine 5'-pyrophosphoric acid (or adenosine diphosphate, hereinafter termed ADP):

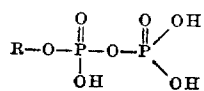

2. Adenosine 5'-triphosphate, hereinafter termed ATP:

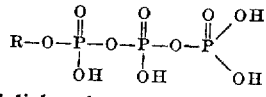

3. Uridine 5'-diphosphate (hereinafter termed UDP):

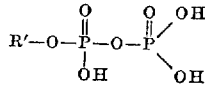

4. Uridine 5'-triphosphate (hereinafter termed UTP):

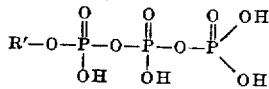

5. Guanosine 5'-diphosphate:

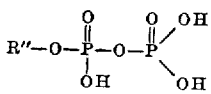

6. Guanosine 5'-triphosphate:

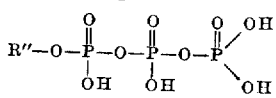

7. Cytidine 5'-diphosphate:

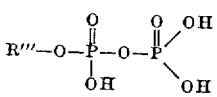

8. Cytidine 5'-triphosphate:

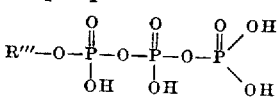

9. Inosine 5'-diphosphate:

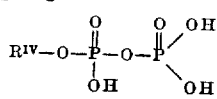

10. Inosine 5'-triphosphate:

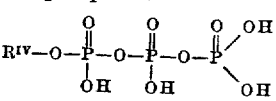

11. Thymidine 5'-diphosphate

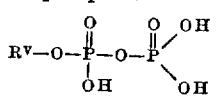

12. Thymidine 5'-triphosphate

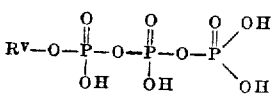

Mononucleotides in general possess useful therapeutic and biological properties or may be employed as intermediates for compounds having such properties. ATP possesses useful therapeutic applications which have indications of being very important while AMP and ADP not only possess therapeutic properties themselves but are also useful as intermediates in the preparation of ATP.

Difficulties have been found in the synthesis of nucleoside polyphosphates and the most suitable methods up to now suggested for the preparation of ADP, ATP, UDP and UTP have been from natural sources. The general problem is the linking up of two molecules of phosphoric compounds to form an anhydride-like pyrophosphate bond. During this reaction the spare unsubstituted hydroxyl groups in the phosphoric grouping need to be prevented from taking part in the reaction and it has been suggested temporarily to block these hydroxyl groups while the reaction is in progress. In the intermediates employed containing these blocking groups, it has also been found necessary to have the hydroxyl groups, which are required to react, substituted with radicals such as chlorine in order to cause preferential reaction of these groups. These factors have made the synthesis expensive, difficult to effect on a large scale and productive of low yields at certain stages. There has been the further difficulty of finding a suitable solvent medium, especially in the case of using AMP or UMP as a starting material. In fact there does not appear to have been suggested for these nucleotide compounds any synthesis which is suitable economically and technically for industrial application.

It is an object of the present invention to provide a direct synthesis of nucleoside polyphosphates which avoids the necessity of utilizing intermediates with temporarily blocked hydroxyl groups and which is suitable for industrial application.

According to the present invention, a process for the preparation of a nucleoside polyphosphate comprises reacting a mononucleotide with phosphoric acid in the presence of a carbodiimide and an aqueous pyridine solvent medium, said mononucleotide having at least one unsubstituted hydroxyl group in the phosphate grouping thereof.

It is found that the presence of the carbodiimide will cause the direct linkage of the main reagents to give a direct synthesis of nucleoside polyphosphates. The carbodiimides have the formula $R'N=C=NR''$ where $R'$ and $R''$ may be the same or different and may be either aliphatic (including cycloaliphatic) or aromatic groups. Examples of $R'$ and $R''$ are as follows:

I, $R'=R''=$cyclohexyl
II, $R'=R''=$p-tolyl
III, $R'=$cyclohexyl, $R''=$isopropyl
IV, $R'=$cyclohexyl, $R''=$phenyl
V, $R'=$p-tolyl, $R''=$phenyl The mononucleotide reagent in this reaction must necessarily possess at least one unsubstituted hydroxyl group in the phosphate grouping in order to effect linkage of the type illustrated above, and will generally possess more than one such unsubstituted hydroxyl group. In the latter case it will be found that, quite surprisingly, the pyridine solvent medium will prevent the spare hydroxyl groups from taking part in the reaction and there is thus avoided the expensive blocking of these spare hydroxyl groups which has hitherto been found necessary.

It is desirable to use a substantial excess of the phosphoric acid in order to minimize the reaction of the nucleotide starting material with itself to form a dinucleotide. Preferably 5–15 molecules of the phosphoric acid are used per molecule of the nucleotide starting material.

Following the reaction of the present invention, a mixed product is generally obtained from which the desired product may be extracted if required in the pure state.

A number of factors effect the relative proportions of these ingredients of the final product. It is believed, for example, that ADP is first formed by reaction of one molecule of AMP with one molecule of phosphoric acid, and that ATP is then formed by reaction of ADP with a further molecule of phosphoric acid. The extent of formation of ATP can therefore be controlled to a certain extent by limiting the availability of the phosphoric acid and/or by limiting the duration of the reaction. Similar factors are involved in the reaction using other nucleotides as starting materials. It has been found that the main factor correlating the extent of formation of the triphosphate to the reaction time is the solubility of the starting material in the pyridine-water solvent. This is believed due to the fact that the effective concentration of the reactants in the reaction phase is higher. Thus the reaction with UMP which is soluble in non-aqueous pyridine proceeds faster than the reaction with AMP which is insoluble in non-aqueous pyridine.

The relative proportions and total amounts of pyridine and water used in the solvent reaction medium also influence the proportions of ingredients in the final product but at the same time are determined to a certain degree by the following factors:

1. AMP and phosphoric acid both need an appreciable proportion of water in the aqueous pyridine solvent before they will dissolve and therefore this proportion should be at least 5%, or preferably 10%, by volume of the pyridine.

2. In the presence of the phosphoric acid, the carbodiimide will react with the water and be rendered unavailable to this extent for the main reaction. Water must therefore be kept to a minimum. Although theoretically only one molecule of carbodiimide is necessary for two molecules of nucleotide, the presence of water will make more carbodiimide necessary, in some cases considerably more, e. g. of the order of fifty molecules per molecule of nucleotide. The larger the proportion of water the larger will be the amount of carbodiimide required.

3. Carbodiimides are soluble in pyridine and other organic solvents but completely insoluble in water. Dilution of the pyridine with water reduces the solubility of the carbodiimide in the solvent medium and this of course renders it advisable to keep the proportion of water in the solvent medium to a minimum.

In the case of the synthesis of UDP and UTP from UMP it was found that the UMP was quite soluble in the pyridine. However, it was necessary to incorporate some water because the pyridinium salt of orthophosphoric acid was relatively insoluble in anhydrous pyridine. Moreover, as in the case of the synthesis of ADP and ATP from AMP, the proportion of water used should be regulated in order to achieve the best results. Although the phosphoric acid is relatively insoluble in a pyridine solution containing small quantities of water, the carbodiimide is relatively insoluble in pyridine solutions containing large quantities of water.

Similar considerations arise in connection with the preparation of other nucleoside polyphosphates depending upon the degree of solubility in pyridine of the reactants involved.

In view of the above factors it will generally be preferable, in the case of a nucleotide starting material which is insoluble in pyridine, for the aqueous pyridine solvent to contain between 5 and 30% by volume of water, the remainder being pyridine; it is, of course, possible to use less water but the reaction is correspondingly less efficient. In the case of a nucleotide starting material which is soluble in pyridine, the proportion of water may be reduced to as low as 2% with a preferred upper limit also of 30%. Clear homogeneous solutions of the reaction mixture will not generally be obtained using large excess of carbodiimide with the aqueous pyridine, and in this event two liquid phase reaction mixtures may be agitated together mechanically.

The following examples are given to illustrate the invention. In these examples, the reference (a) refers to G. A. Lepage, Biochem. Preparations, vol. 1, 1 & 5 (1949), and reference (b) refers to W. E. Cohen and C. E. Carter, J. Am. Chem. Soc., 72, 4273 (1950).

EXAMPLE 1

AMP (200 mg.) and commercial phosphoric acid (85%; 800 mg.) were dissolved in aqueous pyridine (2 cc. $H_2O$+6 cc. pyridine) and dicyclohexyl carbodiimide (4 g.) added. The mixture was agitated mechanically for five hours when a further quantity of dicyclohexyl carbodiimide (2 g.) and pyridine (2 cc.) were added. The vigorous shaking was continued for 12 hours further and dicyclohexyl carbodiimide (1 g.), pyridine (1 cc.), and water (0.1 cc.), were added. After a total reaction period of 26 hours, the precipitated dicyclohexyl urea was filtered off, and washed thoroughly with small amounts of water (total volume of water added 10 cc.). The filtrate was repeatedly extracted with ether and the residual aqueous solution freed from ether in vacuo. Addition of Lohmann's reagent (a) caused the precipitation of mercury salts of AMP, ADP and ATP. The free acids were liberated by passing hydrogen sulphide through the water suspension of mercury salts at 0° C. After neutralization with sodium hydroxide to pH 6, ADP was separated and estimated by the techniques of paper chromatography and ion exchange, methods for which are now well established (b). ADP was recovered as the barium salt from the neutralized eluate after evaporation at 0°–5° C. and treatment with excess barium acetate. These methods of isolation are also previously described (a). Yield of ADP 30–50%.

EXAMPLE 2

The preparation of ADP as described in Example 1 was repeated, dicyclohexyl carbodiimide being replaced by di-p-tolyl carbodiimide. Yield of ADP was similar.

EXAMPLE 3

AMP (200 mg.) and commercial phosphoric acid (85%, 850 mg.) were dissolved in aqueous pyridine (2 cc. $H_2O$+2 cc. pyridine) and a soltuion of dicyclohexyl carbodiimide (4 g.) in pyridine (10 cc.) added. The mixture was agitated mechanically for 4 hours when dicyclohexyl carbodiimide (2 g.) and pyridine (2 cc.) were added. The vigorous shaking was continued for further 16 hours and dicyclohexyl carbodiimide (1 g.), pyridine (1 cc.) and water (0.1 cc.) were added. After another 6 hours shaking the mixture was filtered from dicyclohexyl urea which was washed repeatedly with water. The combined filtrate was exhaustively extracted with ether. Mercury salts of ATP and contaminating ADP and AMP were prepared as described in Example 1. The free acids were liberated by passing hydrogen sulphide through aqueous suspension of mercury salts. ATP was isolated by the technique of ion exchange chromatography (b). Yield of ATP 40–60%.

EXAMPLE 4

The preparation of ATP as described in Example 3 was repeated except that di-p-tolyl carbodiimide was used in place of dicyclohexyl carbodiimide. The yield of ATP was similar.

EXAMPLE 5

AMP (200 mg.) and commercial phosphoric acid (85%, 800 mg.) were dissolved in aqueous pyridine (2 cc. $H_2O$+2 cc. pyridine) and a solution of dicyclohexyl carbodiimide (4 g.) in pyridine (10 cc.) added. The mixture was agitated mechanically for 4 hours when dicyclohexyl carbodiimide (2 g.) and pyridine (2 cc.) were added. The vigorous shaking was continued for further 16 hours and dicyclohexyl carbodiimide (1 g.), pyridine (1 cc.) and water (0.1 cc.) were added. After another 6 hours shaking the mixture was filtered from dicyclohexyl urea which was washed repeatedly with water. The combined filtrate was exhaustively extracted with ether. After acidification of the aqueous solution to pH 2, addition of Lohmann's reagent (a) caused the precipitation of mercury salts of AMP, ADP and ATP. The free acids were freed with hydrogen sulphide and neutralized with sodium hydroxide. Separation of unreacted AMP, ADP and ATP was achieved on an ion exchange column (b) (Dowex 2, chloride form, 200–400 mesh). Elutions were carried out successively with 0.003 N hydrochloric acid (AMP), 0.01 N hydrochloric acid containing 0.025 N sodium chloride (ADP), and 0.01 N hydrochloric acid containing 0.25 sodium chloride (ATP). The eluates containing ADP and ATP were precipitated from the residues as their barium salts by the addition of barium acetate solution. The yields were ADP 30% and ATP 40%.

EXAMPLE 6

The method of Example 5 was repeated except that a different separation technique was used. In place of an ion exchange column, the following method based on the observations of M. W. Kalckar (J. Biol. Chem., 148, 127 (1943) was used. The solution of free acids (AMP, ADP and ATP) obtained from decomposition of their mercury salts in Example 5 was freed from hydrogen sulphide and carefully brought to pH 3.8 with sodium hydroxide. Addition of barium acetate at this pH caused the precipitation of barium salt of ATP. After being kept for several hours at 0°, this was collected by centrifugation and ADP was precipitated from the clear supernatant by raising the pH to 8.5. To obtain pure products it was necessary to repeat the above precipitation procedure once. The yields were similar to those obtained in Example 5.

EXAMPLES 7–11

In these examples the influence of the amount of phosphoric acid, the water content, and the total volume of the pyridine employed in the production of UDP, UTP and higher phosphates was studied. In all these experiments, the amount of UMP used was 100 mg., with a reaction time of 6 hours. The dicyclohexyl carbodiimide used was in large excess over the amount of UMP used, being from 20 molecular proportions to 40 molecular proportions.

Dicyclohexyl carbodiimide (DCC) was added to a solution of UMP and 85% phosphoric acid in aqueous pyridine and the non-homogeneous mixture was agitated mechanically. Crystals of dicyclohexylurea began to separate in 10–20 minutes. After being agitated for varying lengths of time, the reaction mixture was diluted with water, under cooling, and filtered from the urea which was washed thrice with small amounts of water. The combined filtrate and washings were extracted repeatedly with ether to remove excess of pyridine, the residual aqueous solution being freed from dissolved ether through suction under agitation. An aliquot of the solution containing an equivalent of approximately 2 mg. of UMP originally employed was adjusted to pH 7 with ammonium hydroxide and applied on a Dowex-2 ion-exchange resin (200–325 mesh, chloride form) bed (1.5 cm. long x 1 cm. diameter). After washing the column with approximately 20 cc. of water, which removed pyridine, uridine phosphates were eluted as below, the eluant being changed when optical density of the effluent at 260 m$\mu$ fell below 0.050. Average flow rate of liquid was 1 cc. per minute: UMP with 0.01 N HCl+0.015 M NaCl (40–50 cc.); UDP, 0.01 N HCl+0.1 M NaCl (70–80 cc.); UTP, 0.01 N HCl+0.2 N NaCl (80–90 cc.); higher phosphates 1 N HCl (ca. 40 cc.). Table I records the results of ion-exchange analysis (followed by determination of the total optical density of the respective eluates) of reaction products obtained in some typical experiments.

*Table I*

| Example | Phosphoric acid | DCC | Pyridine-water ratio | Solvent, cc. | Yield, percent | | | |
|---|---|---|---|---|---|---|---|---|
| | | | | | UMP | UDP | UTP | Higher phosphates |
| 7 | 10 | 40 | 5 | 12 | 41 | 19 | 40 | |
| 8 | 6 | 45 | 15 | 11 | 15 | 16 | 55 | 14 |
| 9 | 4 | 20 | 15 | 8.2 | 17 | 22 | 40 | 21 |
| 10 | 4 | 30 | 15 | 6.1 | 11 | 23 | 36 | 29 |
| 11 | 2 | 20 | 15 | 6.2 | 19 | 32 | 31 | 18 |

EXAMPLE 12

The reaction of Example 10 was repeated, except that the influence of time on the reaction product was determined. The results are given in Table II Table II

| Time, hr. | Yield, percent | | | |
|---|---|---|---|---|
| | UMP | UDP | UTP | Higher phosphates |
| 1 | 14.8 | 30.1 | 44.0 | 11.1 |
| 2 | 14.8 | 25.6 | 44.2 | 15.4 |
| 3 | 14.3 | 24.0 | 45.1 | 16.6 |
| 4 | 15.4 | 24.7 | 41 | 18.9 |
| 7 | 14.1 | 21.8 | 40.1 | 24.0 |

EXAMPLE 13

Five hundred mg. of UMP was liberated from an appropriate amount of the barium salt by passing a solution of the latter in dilute acetic acid through a Dowex-50 ion-exchange resin column (5 cm. long x 2 cm. diameter) and complete removal under suction of water and acetic acid; the removal of the latter is aided by repeated evaporation after addition of water to the residue. To the solution of UMP and 85% orthophosphoric acid (720 mg.) in a mixture of water (2.45 cc.) and pyridine (36.5 cc.) was added 6 g. of DCC and the mixture was vigorously shaken mechanically for two hours. It was then diluted with 25 cc. of water under cooling and filtered under suction from dicyclohexylurea which was washed with three portions of water (total volume, 20 cc.). The combined filtrate and washings were extracted six times with 100-cc. portions of ether, the aqueous solution then freed from dissolved ether under agitation and concentrated to ca. 15 cc. at 10–15° in a vacuum. The concentrate was passed in two equal parts through two Dowex-50 ion-exchange resin (200–325 mesh, hydrogen form) columns (6 cm. long x 2 cm. diameter), the columns being washed with water until the pH of the effluents rose to neutrality. The combined eluate which was collected in flasks chilled in an ice-salt-bath, was freeze-dried, the flask containing the frozen solution being kept immersed in ice-water throughout. The residual gum was dissolved at below 0° in 10 cc. of ethanol and transferred to a 200-cc. centrifuge tube. The gum and the cloudy ethereal solution resulting on the addition of 100 cc. of cold anhydrous ether were centrifuged at 0° and the clear ethereal solution poured off. The process of precipitation from ethanol-ether mixture was repeated three times, using first 10 cc. of ethanol and 100 cc. of ether, then 15 cc. of ethanol and 100 cc. of ether in the next two precipitations. All the operations were performed as far as possible at or below 0°. The partly solid gum finally obtained was dissolved in 5 cc. of cold water, the solution rapidly neutralized with N sodium hydroxide solution and stored at −20° until required. The solution of the sodium salts of uridine phosphates was absorbed on the top of a Dowex-2 ion-exchange resin (200–325 mesh, chloride form) column (7 cm. long x 2 cm. diameter). After a water (100 cc.) wash, which did not remove any appreciable amount of ultraviolet absorbing material, UMP was removed with 0.01 N HCl+0.015 M NaCl solution (total volume 490 cc., optical density at 260 m$\mu$ 1.7). UDP was then eluted with 0.01 N HCl+0.1 M NaCl, a flow rate of approximately 4 cc. per minute being maintained. Six hundred and sixty cc. of eluate with optical density of 5.5 at 260 m$\mu$ was collected before optical density fell below 0.5, the next 300 cc. of the effluent being discarded. UTP was eluted next with 0.01 N HCl+0.25 M NaCl solution, 520 cc. of eluate with optical density 6.2 being collected.

The neutralized eluate containing UTP was evaporated to complete dryness at 10–15° in vacuo (8–10 mm. pressure), the last 20 cc. of water being removed at 0° in a high vacuum. The dry residue was transferred to a fritted glass funnel and extracted with three 2-cc. portions of water, the extracts being collected through filtration under suction. (The residual sodium chloride cake did not contain any appreciable amount of ultraviolet absorbing material). To the combined extracts was added 2 cc. of 1 M barium acetate solution and the precipitated barium salt centrifuged off after being kept at 0° for 6 hours. It was washed once with one-half cc. of water (the washing being added to the mother liquor), twice with 5 cc. of 50% ethanol, then ethanol and ether, wt. 160 mg. A further amount (60–80 mg.) of practically pure barium salt of UTP was obtained on addition of 4 cc. of ethanol to the above mother liquor, the barium salt being washed thoroughly with 50% ethanol to redissolve some sodium chloride which also was precipitated on the addition of ethanol.

19.8 mg. of the barium salt was dissolved in 25 cc. of 0.01 N HCl and a 2-cc. aliquot diluted further to 25 cc. Optical density at 260 m$\mu$ using a Beckman spectrophotometer (model DU) was found to be 0.720; from this, 18.9 mg. of Ba$_2$UTP·4H$_2$O was calculated to be present in the original 25 cc. of solution, the synthetic sample being thus 95.5% pure. Ion exchange analysis showed only a trace (<2%) of UDP to be present.

The procedure for the isolation of UDP was identical with that described above for UTP, except for addition of 6cc. of ethanol for the precipitation of the barium salt. The concomitantly precipitated sodium chloride was removed during washings with 50% ethanol; wt. of the barium salt, 195 mg. 50 mg. of this sample was dissolved at 0° in ice-cold 0.05 N hydrochloric acid and the mono barium salt (C$_9$H$_{12}$O$_{12}$N$_2$PBa·3H$_2$O)[16] precipitated with equal volume of cold ethanol, collected by centrifugation and washed with ethanol and ether; yield 36 mg.

The synthetic sample was found to be homogeneous and was free from "inorganic" phosphates. Spectrophotometric estimation carried out as described for the barium salt of UTP showed this sample to be 98% pure with respect to the above formula.

It should be understood that methods corresponding to those described above for adenosine and uridine may be used with the other nucleotides. For example, it is possible to prepare guanosine 5'-diphosphate, guanosine 5'-triphosphate, cytidine 5'-diphosphate, cytidine 5'-triphosphate, inosine 5'-diphosphate, inosine 5'-triphosphate, desoxyadenosine 5'-diphosphate, desoxyadenosine 5'-triphosphate, desoxycytidine 5'-diphosphate, desoxycytidine 5'-triphosphate, desoxyguanosine 5'-diphosphate, desoxyguanosine 5'-triphosphate, thymidine 5'-diphosphate and thymidine 5'-triphosphate by corresponding methods.

Although the invention is normally used with the nucleoside monophosphate as the starting material and subsequently converting this to the di- or triphosphate, it will be understood that the invention is broader in its scope. The invention can be considered as a method of adding one or more phosphate groups onto any nucleoside phosphate. Thus, if desired, the diphosphate could be used as the starting material and converted to the triphosphate.

I claim:

1. A process for the preparation of a nucleoside polyphosphate which comprises reacting a mononucleotide with phosphoric acid in the presence of a carbodiimide and an aqueous pyridine solvent medium, the water in said solvent forming 2–30% by volume of the pyridine in the solvent, said mononucleotide having more than one unsubstituted hydroxyl group in the phosphate grouping thereof.

2. A process as claimed in claim 1 in which 5–15 molecules of phosphoric acid are employed per molecule of mononucleotide.

3. A process for the preparation of an adenosine polyphosphate comprising reacting an adenosine phosphate with phosphoric acid in the presence of a carbodiimide and an aqueous pyridine solvent medium, the water in said solvent forming 5–30% by volume of the pyridine in the solvent, said adenosine phosphate having more than one unsubstituted hydroxyl group in the phosphate grouping thereof.

4. A process for the preparation of a uridine polyphosphate comprising reacting a uridine phosphate with phosphoric acid in the presence of a carbodiimide and an aqueous pyridine solvent medium, the water in said solvent forming 2–30% by volume of the pyridine in the solvent, said uridine phosphate having more than one unsubstituted hydroxyl group in the phosphate grouping thereof.

5. A process for the preparation of an adenosine polyphosphate comprising reacting adenosine monophosphate with a substantial excess of phosphoric acid in the presence of a carbodiimide and an aqueous pyridine solvent medium, the water in said solvent forming 5–30% by volume of the pyridine in the solvent.

6. A process for the preparation of a uridine polyphosphate comprising reacting uridine monophosphate with a substantial excess of phosphoric acid in the presence of a carbodiimide and an aqueous pyridine solvent medium, the water in said solvent forming 2–30% by volume of the pyridine in the solvent.

7. A process as claimed in claim 5 in which 5–15 molecules of phosphoric acid are employed per molecule of adenosine monophosphate.

8. A process as claimed in claim 6 in which 5–15 molecules of phosphoric acid are employed per molecule of uridine monophosphate.

9. A process for the preparation of an adenosine polyphosphate selected from the group consisting of adenosine diphosphate of adenosine triphosphate comprising reacting adenosine monophosphate with a substantial excess of phosphoric acid, said phosphoric acid being present in an amount of 5–15 molecules per molecule of adenosine monophosphate, in the presence of a carbodiimide and an aqueous pyridine solvent medium, the water in said solvent forming 5–30% by volume of the pyridine in the solvent, and separating the adenosine polyphosphate from the reaction products.

10. A process for the preparation of a uridine polyphosphate selected from the group consisting of uridine diphosphate or uridine triphosphate comprising reacting uridine monophosphate with a substantial excess of phosphoric acid, said phosphoric acid being present in an amount of 5–15 molecules per molecule of uridine monophosphate, in the presence of a carbodiimide and an aqueous pyridine solvent medium, the water in said solvent forming 2–30% by volume of the pyridine in the solvent, and separating the uridine polyphosphate from the reaction products.

11. A process for the preparation of an adenosine polyphosphate comprising reacting an adenosine phosphate with phosphoric acid in the presence of a carbodiimide and an aqueous pyridine solvent medium, the water in said solvent forming 5–30% by volume of the pyridine in the solvent.

12. A process for the preparation of an adenosine polyphosphate selected from the group consisting of adenosine diphosphate and adenosine triphosphate comprising reacting adenosine monophosphate with phosphoric acid in the presence of a carbodiimide and an aqueous pyridine solvent, the water in said solvent forming 5–30% by volume of said pyridine in the solvent.

13. A process as claimed in claim 12 in which 5–15 molecules of phosphoric acid are employed per molecule of adenosine monophosphate.

No references cited

UNITED STATES PATENT OFFICE

CERTIFICATE OF CORRECTION

Patent No. 2,795,580　　　　　　　　　　　　　　　　June 11, 1957

Har Gobind Khorana

It is hereby certified that error appears in the printed specification of the above numbered patent requiring correction and that the said Letters Patent should read as corrected below.

Column 11, line 31, for "diphosphate of" read -- diphosphate and --; column 12, line 8, for "diphosphate or" read -- diphosphate and --.

Signed and sealed this 29th day of October 1957.

(SEAL)
Attest:

KARL H. AXLINE　　　　　　　　　　　　　　　　　ROBERT C. WATSON
Attesting Officer　　　　　　　　　　　　　　　　Commissioner of Patents